(12) United States Patent
Kimpe et al.

(10) Patent No.: US 9,146,845 B1
(45) Date of Patent: Sep. 29, 2015

(54) SYSTEMS AND METHODS FOR PROVISIONING NODES OF A PACKET NETWORK

(75) Inventors: Marc Kimpe, Huntsville, AL (US);
Charles E. Polk, Jr., Athens, AL (US);
Andrew T. Ruble, Elkmont, AL (US);
Troy Wayne White, Toney, AL (US);
Jamie S. Kelly, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 557 days.

(21) Appl. No.: 12/904,761

(22) Filed: Oct. 14, 2010

(51) Int. Cl.
*G06F 15/177* (2006.01)
*G06F 12/00* (2006.01)
G06F 15/173 (2006.01)
G06F 15/00 (2006.01)

(52) U.S. Cl.
CPC .............. *G06F 12/00* (2013.01); *G06F 15/00* (2013.01)

(58) Field of Classification Search
CPC .................................. G06F 12/00; G06F 15/00
USPC ......................................................... 709/220
See application file for complete search history.

(56) References Cited

U.S. PATENT DOCUMENTS

| | | | |
|---|---|---|---|
| 6,308,205 B1 | 10/2001 | Carcerano et al. | |
| 7,058,716 B1 | 6/2006 | Sundaresan et al. | |
| 7,453,906 B2 * | 11/2008 | Simonnet et al. | 370/469 |
| 7,581,096 B2 | 8/2009 | Balfanz et al. | |
| 2003/0172141 A1 | 9/2003 | Miller, II et al. | |
| 2005/0015763 A1 * | 1/2005 | Alexander et al. | 718/100 |
| 2007/0097884 A1 | 5/2007 | Chewning et al. | |
| 2008/0304427 A1 * | 12/2008 | Biswas et al. | 370/255 |
| 2009/0156209 A1 | 6/2009 | Franklin et al. | |
| 2010/0118708 A1 * | 5/2010 | Long et al. | 370/241.1 |
| 2010/0161770 A1 * | 6/2010 | Ferro et al. | 709/221 |
| 2010/0246436 A1 * | 9/2010 | Yang et al. | 370/254 |

\* cited by examiner

*Primary Examiner* — Joseph Greene
(74) *Attorney, Agent, or Firm* — Maynard Cooper & Gale, P.C.; Jon E. Holland (57) ABSTRACT

The present disclosure generally pertains to systems and methods for provisioning nodes of a packet network. Rather than requiring a user to individually set the configuration parameters of each node to achieve a desired behavior, the user is presented with options of various predefined network behaviors and/or the option of customizing a network behavior, such as a queuing, scheduling, or shaping profile, and each node is configured to automatically provision its configuration parameters to implement the desired behavior. Information is passed from node-to-node so that each node can automatically provision its settings to implement such behavior. Thus, the network is automatically provisioned thereby facilitating the provisioning process. Automatic provisioning also helps to ensure a correct network configuration. Indeed, since the provisioning is automatic, at least some manual provisioning errors may be prevented.

14 Claims, 5 Drawing Sheets

SYSTEMS AND METHODS FOR PROVISIONING NODES OF A PACKET NETWORK

RELATED ART

In a packet system, a packet will typically travel through various nodes, such as switches, that typically implement a variety of configurations. Setting all of the configuration parameters individually on each node can lead to unexpected behavior or configuration errors, particularly if the user provisioning the nodes is inexperienced or unfamiliar with the network. Given the wide variety of provisioning options and parameters, it is difficult to ensure that all nodes are configured properly or that multiple systems are configured in a desired manner (queue depth, number of queues, color awareness, discard mechanism, etc.).

In addition to the difficulty of ensuring the correct configuration of a packet network, the task of provisioning a packet network can be burdensome and time consuming. Indeed, many packet networks employ thousands of nodes, and manually provisioning a large number of nodes can be problematic. Generally, techniques for facilitating the process of provisioning and ensuring the correct configuration of nodes in a packet network are desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for provisioning nodes of a packet network. Rather than requiring a user to individually set the configuration parameters of each node to achieve a desired behavior, the user is presented with options of various predefined network behaviors and/or the option of customizing a network behavior, such as a queuing, scheduling, or shaping profile, and each node is configured to automatically provision its configuration parameters to implement the desired behavior. Information is passed from node-to-node so that each node can automatically provision its settings to implement such behavior. Thus, the network is automatically provisioned thereby facilitating the provisioning process. Automatic provisioning also helps to ensure a correct network configuration. Indeed, since the provisioning is automatic, at least some manual provisioning errors may be prevented.

In one exemplary embodiment, a first node is configured to receive user selections indicating a desired behavior of the network, and the first node is configured to automatically provision its configuration parameters based on its resource configuration to implement the desired behavior. To correctly establish its configuration parameters, the first node has knowledge of its resource configuration, such as the number queues, the size of each queue, and other parameters that are typically used during provisioning. Based on such configuration information and the user selections indicative of the desired behavior, the first node computes the values of the configuration parameters to be provisioned and then sets such parameters to the computed values such that the first node is provisioned to implement the behavior selected by the user.

The first node also communicates information indicative of the desired behavior to a second network node, and the second network node automatically provisions its configuration parameters in a similar manner based on its resource configuration, which may be different than the resource configuration of the first node. For example, the second node may have different numbers of queues or different queue depths such that the settings for the same parameters computed by the second node may be different than those computed by the first node in order to implement the desired behavior. Moreover, information indicative of the desired behavior is passed through the network until each node that is to be provisioned has received the behavioral information and has automatically provisioned its parameters to implement the desired behavior. As a mere example, a user may provide an aggregation node with at least one input indicative of the desired network behavior, and such information may be sent to each root node that feeds the aggregation node. Each such root node then tailors its configuration parameters to its specific resource configuration to implement the desired behavior.

Figure 1:
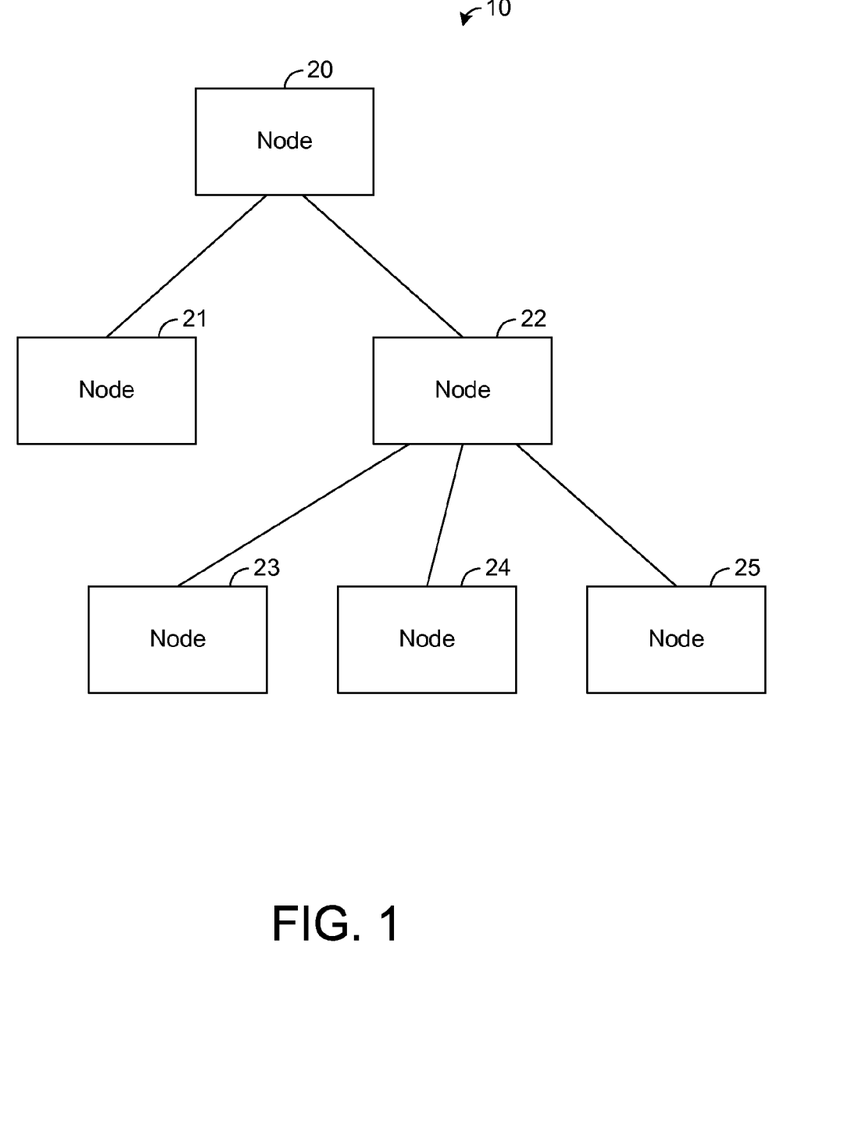
FIG. 1 is a block diagram illustrating an exemplary embodiment of a communication network.

FIG. 1 depicts an exemplary embodiment of a network 10 having a plurality of nodes 20-25 to be provisioned in order to implement a desired network behavior. In this regard, assume that it is desirable to provision nodes 20-25 such that each node 20-25 implements the same behavior. Node 20 is an aggregation node that is fed by the other nodes 21-25. In other embodiments, other configurations of the network 10 are possible. FIG. 1 shown five nodes 20-25 for simplicity of illustration, but the network 10 may comprise any number of other nodes (not shown).

Figure 2:
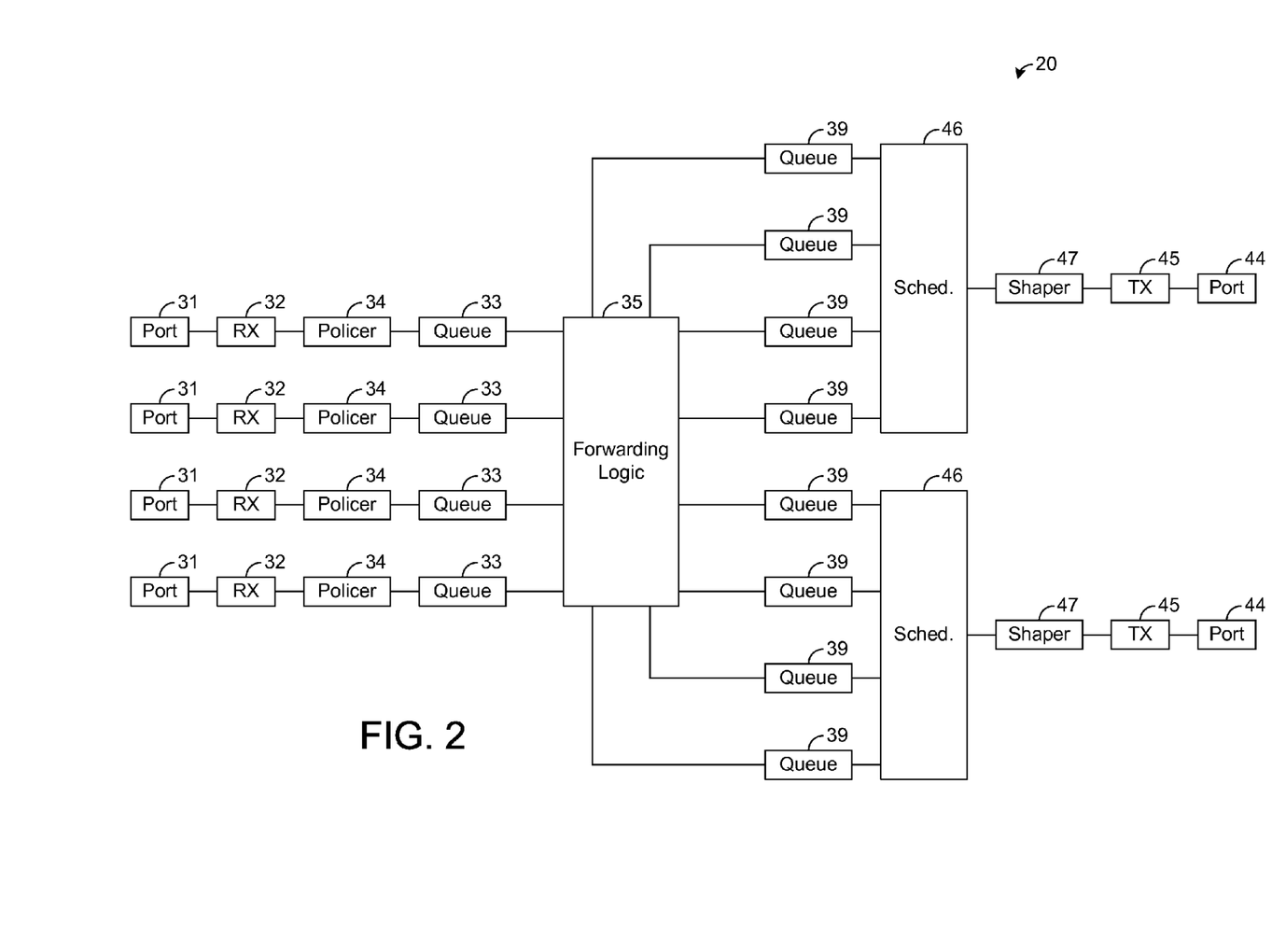
FIG. 2 is a block diagram illustrating an exemplary embodiment of a network node, such as is depicted by FIG. 1.

FIG. 2 depicts an exemplary embodiment of the node 20. The exemplary node 20 shown by FIG. 2 implements a switch, but the node 20 may implement other types of network devices in other embodiments. In the embodiment shown by FIG. 2, the node 20 has a plurality of ports 31, referred to hereafter as "ingress ports," that are respectively coupled to other nodes of the network 10. Each ingress port 31 is coupled to a receiver 32 and a queue 33, referred to hereafter as an "ingress queue." The receiver 32 receives data packets from another node (not shown in FIG. 2) of the network 10, and the ingress queue 33 buffers such packets. As shown by FIG. 2, each ingress port 31 may be coupled to its respective ingress queue 33 through a policer 34 that limits the rate of packets received by the queue 33 in an effort to control the flow of data into the queue 33 and to prevent overruns in the queue 33.

Forwarding logic 35 pulls packets from the ingress queues 33 and forwards the packets to queues 39, referred to hereafter as "egress queues," based on forwarding data 41 (FIG. 3) stored in memory 42. Each such egress queue 39 is coupled to a port 44, referred to hereafter as an "egress port," through a transmitter 45. Each egress port 41 is coupled to a respective node (not shown in FIG. 2) of the network 10. For each packet, the forwarding data 41 (FIG. 3) maps information in the packet, such as the packet's destination address, to a port identifier that can be used by the forwarding logic 35 to forward the packet to the appropriate egress queue 39. In one embodiment, each egress queue 39 is coupled to a single egress port 44 such that each packet buffered by the queue 39 is ultimately transmitted to the same egress port 44. In other embodiments, it is possible for packets in the same egress queue 39 to flow to multiple egress ports 44. The configuration and number of components shown by FIG. 2 are exemplary, and other configurations and numbers of components are possible in other embodiments.

For example, in the embodiment shown by FIG. 2, each egress port 44 is coupled to a set of four egress queues 39, but any given egress port 44 may be coupled to any number of egress queues 39 in other embodiments. When a packet is received by an ingress port 31, the packet is forwarded through the node 20 to one of the egress ports 44, based on the forwarding data 41 (FIG. 3), for transmission to another node of the network 10.

As shown by FIG. 2, each egress port 44 is coupled to a scheduler 46 and a shaper 47 for controlling the flow of packets from the port's queues 39. The scheduler 46 generally determines the order in which data packets are pulled from the port's egress queues 39, and the shaper 46 generally determines the timing of when data packets are pulled from the port's egress queue 39. Various types of queuing, scheduling, and shaping algorithms may be implemented by the egress queues 39, the schedulers 46, and the shapers 47 depending on the desired behavior for the node 20.

Figure 3:
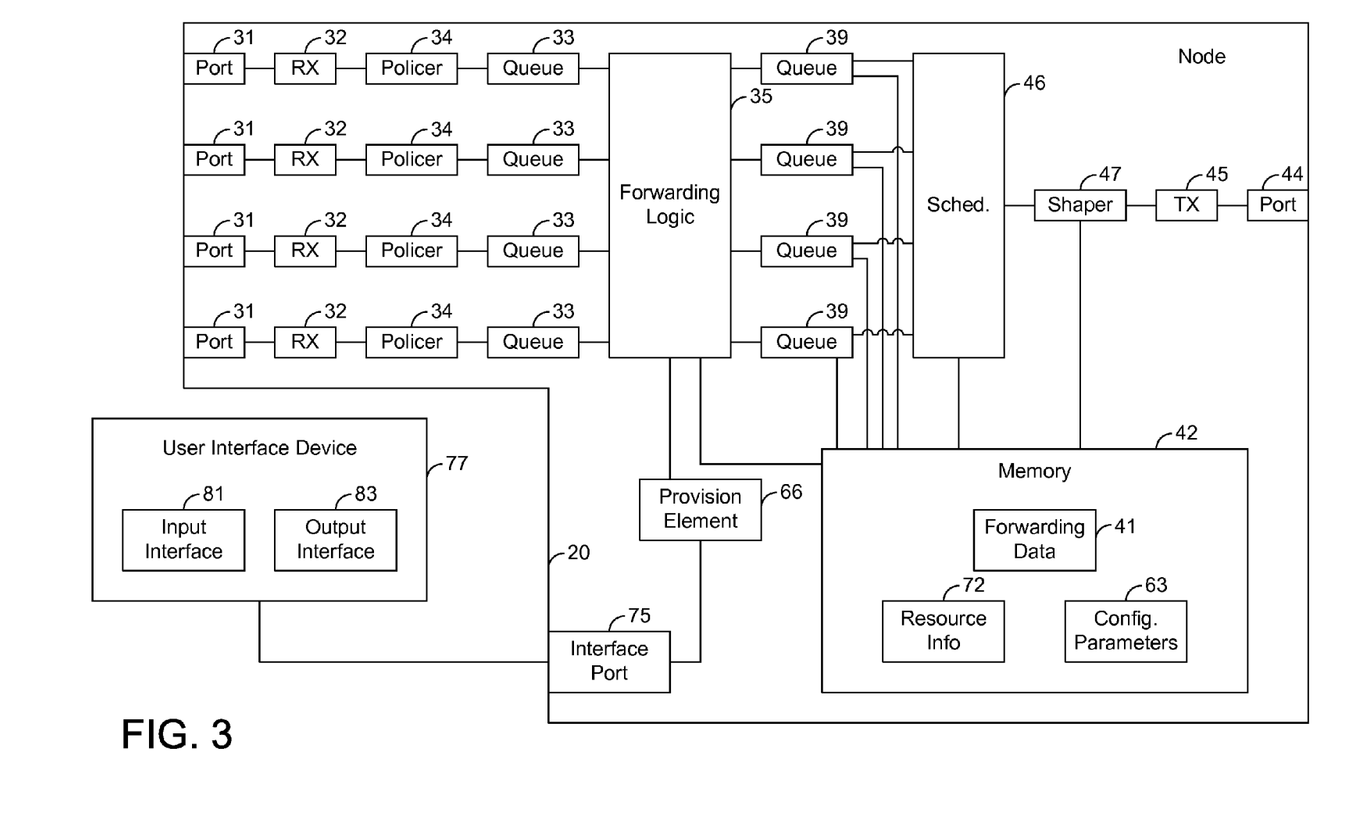
FIG. 3 is a block diagram illustrating an exemplary embodiment of a network node, such as is depicted by FIG. 2.

In this regard, refer to FIG. 3, which depicts an exemplary embodiment of the node 20 shown by FIG. 2. For simplicity of illustration, an egress port 44 and the components coupled between such egress port 44 and the forwarding logic 35 are not shown in FIG. 3. As shown by FIG. 3, configuration parameters 63 are provisioned and stored in memory 42. As an example, the configuration parameters 63 may be stored in registers (not specifically shown) accessible to the egress queues 39, the schedulers 46, and the shapers 47. The configuration parameters 63 are used by the components of the node 20 to implement the desired behavior for the node 20. In particular, the configuration parameters 63 are provisioned such that the egress queues 39, schedulers 46, and shapers 47 implement the desired queuing, scheduling, and shaping algorithms. As a mere example, the configuration parameters 63 may be set such that one egress queue 39 implements strict priority queuing while another egress queue 39 implements weighted-fair-queuing. Further, the configuration parameters 63 may indicate the weighting percentages to be applied to such weight-fair-queuing. In other examples, other types of behavioral characteristics may be may be defined by the configuration parameters 63 for the egress queues 39 or other components, such as the receivers 32, ingress queues 33, policers 34, transmitters 45, schedulers 46, shapers 47, etc.

The node 20 also comprises logic 66, referred to hereafter as a "provision element," that is configured to automatically provision the node 20, as will be described in more detail hereafter. Note that the policers 34, forwarding logic 35, the schedulers 46, the shapers 47, and the provision element 66 may be implemented in hardware, software, firmware, or any combination thereof. Further, the ports 31 and 44 are hardware components, and the receivers 32, transmitters 45, and queues 33 and 39 may be implemented in hardware or a combination of hardware along with software and/or firmware.

Note that, when a component is implemented in software, such component can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus. Further, if the node 20 comprises software, then the node 20 preferably has at least one instruction execution apparatus (not shown), such as a central processing unit (CPU) or digital signal processor (DSP), for executing instructions of the software. In one exemplary embodiment, at least the provision element 66 is implemented in software and stored in memory 42, but other configurations of the provision element 66 are possible in other embodiments.

The provision element 66 is configured to access resource information 72 and to use such information 72 to provision the configuration parameters 63. In this regard, the resource information 72 indicates the configuration of the node 20, including the hardware resources of the node 20. As an example, the resource information 72 may indicate the number of and identify ingress ports 31, ingress queues 33, egress queues 39, and egress ports 44 in the node 20. The resource information 72 may also indicate the queue depth for each queue 33 and 39 in the node 20, as well as other information that is typically used to provision network nodes.

The node 20 also has an interface port 75 that can be detachably coupled to an external device, such as a user interface device 77, as shown by FIG. 3. The exemplary user interface device 77 shown by FIG. 3 has a user input interface 81, such as a keypad, key board, or a mouse, through which a user can provide inputs, and a user output interface 83, such as a display device (e.g., a liquid crystal display (LCD)) or a printer, through which outputs can be provided to a user.

Using the interface device 77, a user submits inputs indicating a desired behavior for the network 20. The provision element 66 receives such inputs and then utilizes the resource information 72 to discover the configuration of the node 20, such as the types of resources in the node 20, and then provisions the configuration parameters 63 such that the desired behavior, as indicated by the user inputs, is implemented. As a mere example, if the inputs indicate that strict priority queuing is desired, then the provision element 66 provisions the configuration parameters 63 such that the strict priority queuing is implemented by the egress queues 39 and schedulers 46. However, if weighted-fair-queuing is desired for at least one egress queue 39, then the provision element 66 provisions the configuration parameters 63 such that weighted-fair-queuing is implemented for such queue 39.

The provision element 66 is also configured to pass information indicative of the desired behavior, such as the user inputs received from the user interface device 77 or values for the configuration parameters 63 computed by the provision element 66, to other nodes 21-25 of the network 20. As an example, the provision element 66 may packetize such information into one or more data packets and provide the data packets to the forwarding logic 35, which forwards the data packets to the egress queues 39 for transmission from the node 20. The other nodes 21-25 may be configured similar to the node 20, and each node 21-25 may provision its configuration parameters such that it implements the desired behavior for the network 20. However, any node 21-25 may have different resources relative to the other nodes of the network 10, such as different numbers of queues and different queue depths, and may have to provision its configuration parameters differently to implement the desired behavior. In this regard, each node 20-25 tailors its provisioning according to its respective configuration, as indicated by resource information stored in such node, in order to implement the behavior indicated by the behavioral information received from the user or otherwise.

Figure 4:
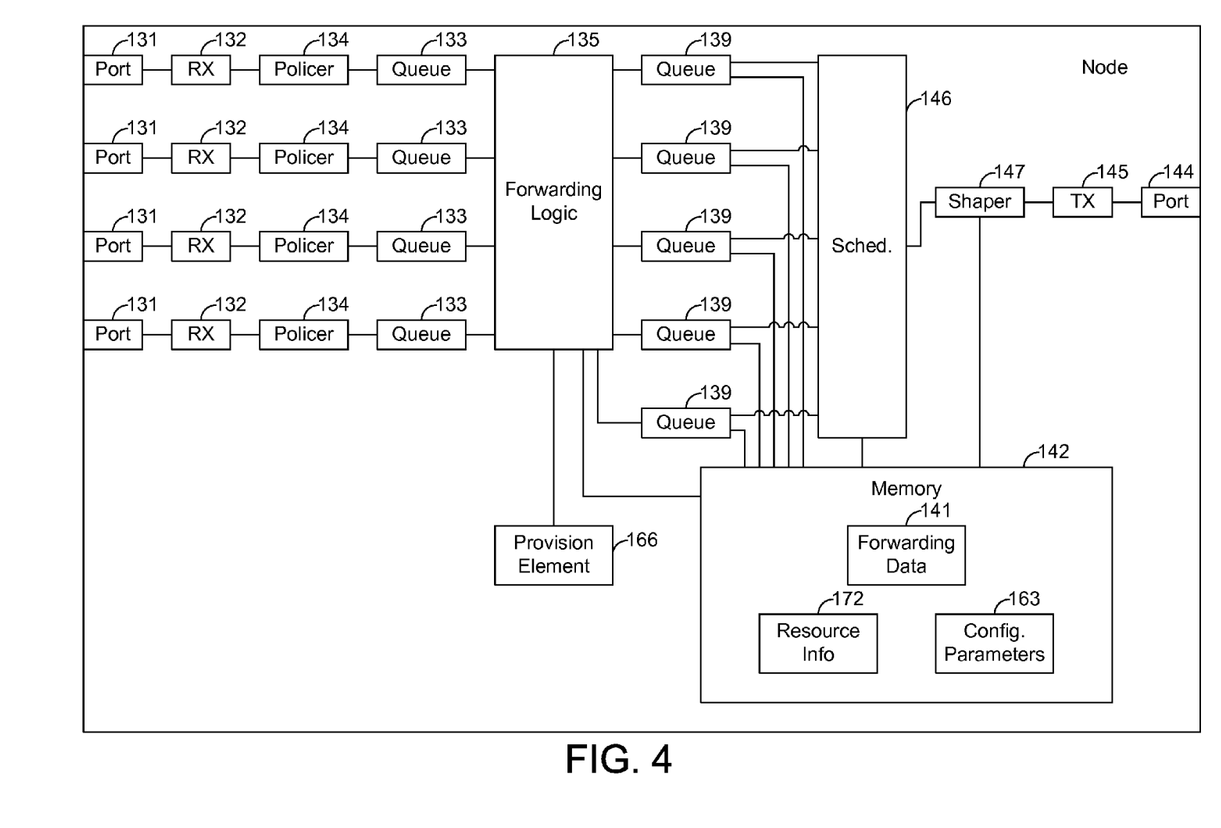
FIG. 4 is a block diagram illustrating an exemplary embodiment of a network node, such as is depicted by FIG. 1.

As a mere example, FIG. 4 depicts an exemplary embodiment of another node 21 of the network 20. The node 21 is a root node of the aggregation node 20 of FIG. 3. Like the node 20 of FIG. 3, the node 21 has ingress ports 131, receivers 132, ingress queues 133, policers 134, forwarding logic 135, egress queues 139, forwarding data 141, egress ports 144, transmitters 145, schedulers 146, shapers 147, configuration parameters 163, provision element 166, and resource information 172. Except as otherwise described herein, such components are configured to operate the same or similar to the like components of FIGS. 2 and 3.

The information indicative of the desired network behavior transmitted from the node 20 is forwarded to the provision element 166 by the forwarding logic 135. In response, the provision element 166 provisions the configuration parameters 163 based on the resource information 172. However, the configuration of the node 21 is slightly different than that of the node 20. For example, as can be seen by comparing FIGS. 3 and 4, the node 21 has an additional egress queue 139 coupled to a given scheduler 146. Also, the queue depths of the egress queues 139 of the node 21 may be different than the queue depths of the egress queues 39 of the node 21. Various other configuration differences may exist between the nodes 20 and 21 as well.

Moreover, in order to implement the same desired network behavior, the provision element 166 may provision the configuration parameters 163 different than the provision element 66 of the node 20 provisions the configuration parameters 63. Indeed, each node 20-25 is aware of its own specific configuration and, thus, tailors its configuration parameters based on such configuration such that it exhibits the desired behavior indicated by the user. Further, the nodes 20-25 pass the desired behavioral information to each other so that the nodes 20-25 can be automatically provisioned as desired. For example, in the embodiment described above, the node 20 receives information indicative of the desired behavior from a user. The node 20 may pass the information to all of its root nodes. In particular, the node 20 passes the information to the nodes 21 and 22, and the node 22 passes the information to the nodes 23-25. Any number of nodes and hierarchical levels may be provisioned according to the techniques described herein.

An exemplary use and operation of the network 10 will now be described in more detail below. It should be emphasized that such use and operation are presented for illustrative purposes, and various changes to the use and operation would be apparent to one of ordinary skill upon reading this disclosure.

In one exemplary embodiment, the provision element 166 is configured to display, via the output interface 83, a plurality of predefined options for a queuing profile. As an example, assume that one option is for 4 strict priority queuing and that another option is for weighted-fair-queuing with weights of 25%, 25%, 10%, and 40% for four queues 39. Alternatively, the user is allowed to customize the queuing profile. For example, the user may specify weighted-fair-queuing with weights different than the weights for the predefined option described above or a different type of queuing altogether. For illustrative purposes, assume that the user specifies that, per egress port 144, strict priority queuing is to be used for two queues and that weighted-fair-queuing having weights of 25% and 75% are to be used for two queues.

In response to user inputs indicative of the desired queuing profile selected or otherwise defined by the user, the provision element 66 provisions the configuration parameters 63 according to the desired queuing profile. For example, for four egress queues 39 servicing the same egress port 44, the provision element 66 provisions the configuration parameters 63 such that two of the egress queues 39 implement strict priority queuing and the remaining two egress queues 39 implement weighted-fair-queuing at weights of 25% and 75%, respectively. In provisioning the configuration parameters 63, the provision element 66 may compute values for various queuing parameters, such as queue depth, etc., and set the configuration parameters according to such computed values to achieve the desired behavior.

The provision element 66 also passes information indicative of the desired queuing profile to the node 21. As an example, the node 20 may transmit to the node 21 the same data received via the interface port 75 (FIG. 3) or, alternatively, the values computed by the provision element 66 for the configuration parameters 63. Other types of information may be transmitted in other embodiments.

The desired queuing profile applies to four queues, but as shown by FIG. 4, the node 21 has five egress queues 139 per egress port 144. For five egress queues 139 servicing the same egress port 144, the provision element 166 provisions the configuration parameters 163 such that two of the egress queues 39 implement strict priority queuing and two other egress queues 39 implement weighted-fair-queuing at weights of 25% and 75%, respectively. Since the desired queuing profile contemplates four queues, the provision element 166 provisions the configuration parameters 163 such that the fifth egress queue 139 servicing the same egress port 144 is disabled. Accordingly, during operation, only four egress queues 139 servicing the same egress port 144 receive and buffer data packets from the forwarding logic 135. Thus, even though the node 21 has a different queuing configuration relative to the node 20, both nodes 20 and 21 are configured to implement the same desired queuing profile.

Figure 5:
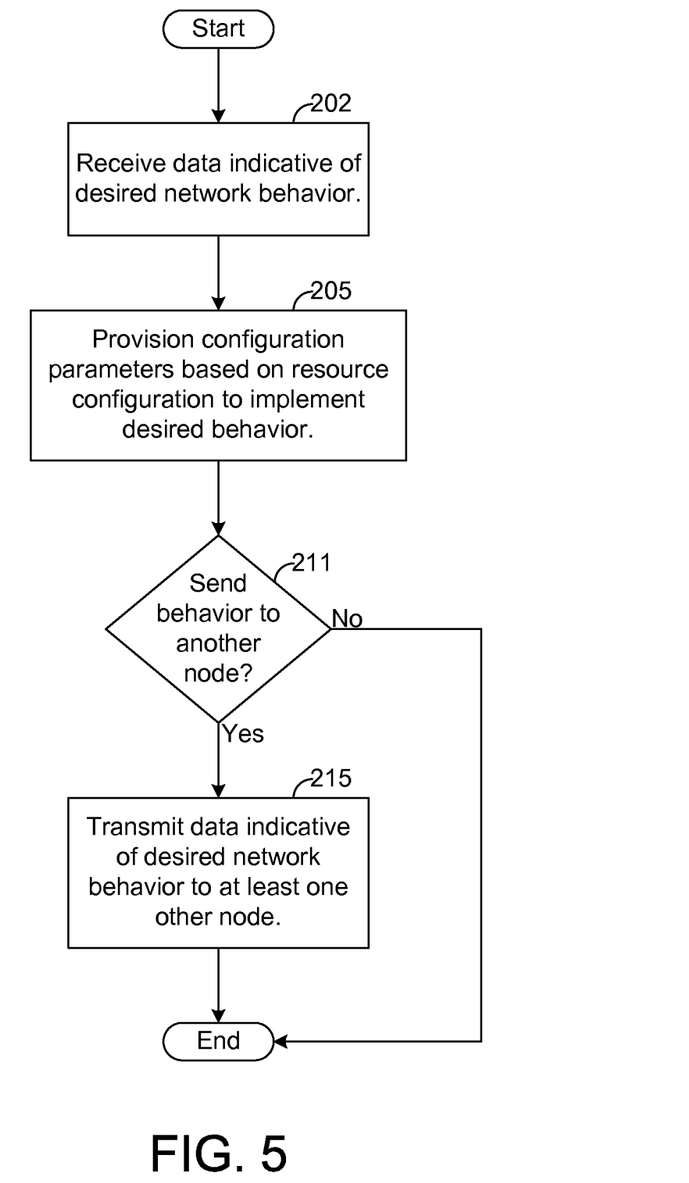
FIG. 5 is a flowchart illustrating an exemplary method of provisioning a network node, such as is depicted by FIG. 1.

As shown by FIG. 5, each node of the network 10 similarly provisions its configuration parameters such that the queuing profile is implemented at each node 20-25 of the network 25. In this regard, as shown by block 202, each node 20-25 receives data indicative of a desired network behavior, which in this case is a queuing profile. In one exemplary embodiment, the node 20 receives such data from the user interface device 77, and each of the nodes 21-25 receives such data from another node of the network 10. Based on the received data, each node 20-25 provisions its configuration parameters, as described above and shown by block 205. Each node 20-25 also determines in block 211 whether to transmit data indicative of the desired network behavior to another node of the network 10. If the node is coupled to another node within the network 10 that has yet to receive such data, then the node forwards the data to such other node, as shown by block 215.

As can be seen in the above example, the user submits inputs indicative of the desired queuing profile once, and the desired queuing profile is automatically provisioned into each node 20-25 of the network 10. Thus, the provisioning process is facilitated resulting in a provisioning process that is much less burdensome and time consuming relative to an embodiment in which the user manually provisions each node 20-25 to implement the desired queuing profile. In addition, since the nodes 20-25 automatically implement the specified queuing profile, the chances of an inadvertent error in provisioning are reduced. In this regard, human error in manually provisioning nodes can result in misconfigurations that cause operational errors, which can be difficult to detect and/or diagnose.

The above example above illustrates how different nodes 20-25 can be provisioned to implement the same queuing profile. However, there are many types of configuration parameters other than queuing that may be provisioned according to similar techniques. For example, similar techniques could be used to provision spectrum management, scheduling, policing, link rates, and other types of configuration parameters. As a mere example, each node 20-25 may be provisioned to implement a desired scheduling algorithm that is selected or otherwise defined for schedulers via user input. Also, each node 20-25 may be provisioned to implement a desired shaping algorithm that is selected or otherwise defined for shapers via user input, and each node 20-25 may be provisioned to implement a desired data rate that is selected or otherwise defined for transmitters via user input. In addition, each node may be provisioned to implement a desired rate limit that is selected or otherwise defined for policers via user input. Various other types of configuration parameters may be provisioned according to the techniques described herein.

Now, therefore, the following is claimed:

1. A network node device, comprising:
a plurality of queues; memory for storing configuration parameters and resource information, the resource information indicative of a configuration of hardware resources of the network node device, wherein the resource information indicates a respective depth for each of the queues, and wherein the queues are configured to operate based on the configuration parameters; and logic configured to receive data indicative of a desired queuing profile, the logic configured to determine, based on the data and the configuration indicated by the resource information, how to provision the configuration parameters in order for the network node device to implement the desired queuing profile, wherein the logic is further configured to automatically provision the configuration parameters such that the network node device implements the desired queuing profile, wherein the logic is configured to transmit data indicative of the desired queuing profile to another network node device thereby enabling provisioning of the other network node device to implement the desired queuing profile.

2. The network node device of claim 1, wherein a total number of the queues in the network node device is different than a total number of queues in the other network node device, and wherein the other network node device is configured to implement the indicated queuing profile.

3. The network node device of claim 1, wherein the data received by the logic is based on at least one user input indicative of the desired queuing profile.

4. A method for provisioning network node devices, comprising the steps of: storing, in memory of a first node device of a network, first configuration parameters and first resource information, the first resource information indicative of a configuration of hardware resources of the first node device; receiving data indicative of a desired network behavior; automatically determining, based on the data and the first resource information, how to provision the first configuration parameters such that the first configuration parameters are tailored according to the configuration of the hardware resources of the first node device for implementing the desired network behavior; automatically provisioning the first configuration parameters based on the determining how to provision the first configuration parameters step such that the first node device implements the desired network behavior; operating the hardware resources based on the first configuration parameters; transmitting data indicative of the desired network behavior from the first node device to a second node device of the network; storing, in memory of the second node device, second configuration parameters and second resource information, the second resource information indicative of a configuration of hardware resources of the second node device; automatically determining, based on the data transmitted to the second node device and the second resource information, how to provision the second configuration parameters such that the second configuration parameters are tailored according to the configuration of the hardware resources of the second node device for implementing the desired network behavior; automatically provisioning the second configuration parameters based on the determining how to provision the second configuration parameters step such that the second node device implements the desired network behavior; and operating the hardware resources of the second node device based on the second configuration parameters, wherein the configuration of the hardware resources of the first node device is different than the configuration of the hardware resources of the second node device such that the first configuration parameters provisioned by the first node device are different than the second configuration parameters provisioned by the second node device.

5. The method of claim 4, wherein the hardware resources of the first node device comprise a queue, and wherein the received data is indicative of a queuing profile.

6. The method of claim 5, wherein a total number of queues in the first node device is different than a total number of queues in the second node device.

7. The method of claim 4, wherein the hardware resources of the second node device comprise a scheduler, and wherein the received data is indicative of a scheduling algorithm.

8. The method of claim 4, wherein the received data is based on at least one user input.

9. The method of claim 4, wherein the hardware resources of the first node device comprise a queue, wherein the first resource information indicates a queue depth for the queue, wherein one of the first configuration parameters controls queuing by the queue, and wherein the provisioning the first configuration parameters step comprises the step of provisioning the one configuration parameter based on the data and the first resource information.

10. A method for provisioning network node devices, comprising the steps of: defining data indicative of a desired queuing profile; transmitting the data to each of a plurality of node devices nodes of a network, the plurality of node devices including at least a first node device and a second node device; at each respective node device of the plurality of node devices, performing the following steps: storing, in memory, configuration parameters for the respective node device; retrieving resource information identifying hardware resources of the respective node device and indicating a configuration of the hardware resources; automatically determining, based on the data and the resource information, how to provision the configuration parameters such that the configuration parameters are tailored according to the configuration indicated by the resource information for implementing the desired queuing profile; automatically provisioning the configuration parameters based on the determining step such that the respective node device implements the desired queuing profile; and transmitting the data indicative of the desired queuing profile to another node device of the network, wherein a configuration of the first node device is different than a configuration of the second node device such that the configuration parameters provisioned by the first node device are different than the configuration parameters provisioned by the second node device.

11. The method of claim 10, wherein the data is based on at least one user input.

12. The method of claim 4, wherein the hardware resources of the first node device include a plurality of queues, and wherein the first resource information indicates a respective depth for each of the queues.

13. A network, comprising: a first node device having memory for storing first configuration parameters and first resource information, the first resource information indicative of a configuration of hardware resources of the first node device, wherein the hardware resources of the first node device are configured to operate based on the first configuration parameters, the first node device configured to receive data indicative of a desired network behavior and to determine, based on the data and the first resource information, how to provision the first configuration parameters such that the first configuration parameters are tailored according to the configuration of the hardware resources of the first node device for implementing the desired network behavior, wherein the first node device is further configured to provision the first configuration parameters such that the first node device implements the desired network behavior; and a second node device having memory for storing second configuration parameters and second resource information, the second resource information indicative of a configuration of hardware resources of the second node device, wherein the hardware resources of the second node device are configured to operate based on the second configuration parameters, the second node device configured to receive the data from the first node device and to determine, based on the data and the second resource information, how to provision the second configuration parameters such that the second configuration parameters are tailored according to the configuration of the hardware resources of the second node device for implementing the desired network behavior, wherein the second node device is further configured to provision the second configuration parameters such that the second node device implements the desired network behavior, wherein the configuration of the hardware resources of the first node device is different than the configuration of the hardware resources of the second node device such that the first configuration parameters provisioned by the first node device are different than the second configuration parameters provisioned by the second node device.

14. The network of claim 13, wherein the hardware resources of the first node device include a plurality of queues, and wherein the first resource information indicates a respective depth for each of the queues.

* * * * *